US008853011B2

(12) United States Patent
Cheng et al.

(10) Patent No.: US 8,853,011 B2
(45) Date of Patent: Oct. 7, 2014

(54) REPAIRING METHOD, REPAIRING DEVICE, AND REPAIRING STRUCTURE FOR DISCONNECTED DEFECT

(71) Applicant: Shenzhen China Star Optoelectronics Technology Co., Ltd., Guangdong (CN)

(72) Inventors: Wen-da Cheng, Guangdong (CN); Chujen Wu, Guangdong (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 12 days.

(21) Appl. No.: 13/811,388

(22) PCT Filed: Dec. 13, 2012

(86) PCT No.: PCT/CN2012/086502
§ 371 (c)(1),
(2), (4) Date: Jan. 22, 2013

(87) PCT Pub. No.: WO2014/086057
PCT Pub. Date: Jun. 12, 2014

(65) Prior Publication Data
US 2014/0162379 A1   Jun. 12, 2014

(30) Foreign Application Priority Data

Dec. 7, 2012   (CN) .......................... 2012 1 0524347

(51) Int. Cl.
*H01L 21/00*   (2006.01)
*H01L 21/84*   (2006.01)
*G02F 1/1362*   (2006.01)

(52) U.S. Cl.
CPC ................. *G02F 1/136259* (2013.01)
USPC ....... 438/149; 438/30; 257/359; 257/E21.134; 257/E21.411; 257/E21.475; 257/E21.499; 257/E21.501; 257/E21.502

(58) Field of Classification Search
USPC ................... 438/30, 149, 308, 378, 463, 535; 257/359, 414, 431, 659, E21.134, 257/E21.411, E21.475, E21.499, E21.501, 257/E21.502
See application file for complete search history.

(56) References Cited

U.S. PATENT DOCUMENTS

| 5,102,361 | A  | * | 4/1992 | Katayama et al. ................. 445/4 |
| 5,278,012 | A  | * | 1/1994 | Yamanaka et al. .............. 430/30 |
| 6,605,478 | B2 | * | 8/2003 | Pnueli et al. ..................... 438/14 |
| 6,734,687 | B1 | * | 5/2004 | Ishitani et al. ........... 324/750.19 |
| 8,103,976 | B2 | * | 1/2012 | Kim et al. ....................... 716/50 |

* cited by examiner

Primary Examiner — David Nhu

(57) ABSTRACT

A repairing method, repairing device and repairing structure for repairing a signal line of an array substrate having the disconnected defect, including: setting a repairing route according to a position of the disconnected defect and determining a position at which a filling portion is required to be formed according to the repairing route; forming the filling portion at the position at which the filling portion is required to be formed; and forming a repairing line along the repairing route. By detecting the repairing route before repairing the disconnected defect by forming the filling portion according to the repairing route, the present disclosure can avoid the disconnection of the repairing line caused by great height differences of the surface under the repairing line and improve the repairing success rate of the disconnected defect.

16 Claims, 4 Drawing Sheets

REPAIRING METHOD, REPAIRING DEVICE, AND REPAIRING STRUCTURE FOR DISCONNECTED DEFECT

This application is a 35 U.S.C. 371 national application of PCT/CN2012/086502 filed on Dec. 13, 2012, which claims priority or the benefit under 35 U.S.C. 119 of Chinese application no. CN201210524347.7 filed on Dec. 7, 2012.

BACKGROUND

1. Technical Field

The present disclosure relates to liquid crystal displaying technologies, and particularly, to a repairing method, a repairing device, and a repairing structure for a disconnected defect of a TFT array substrate.

2. Description of Related Art

TFT-LCD (Thin Film Transistor Liquid Crystal Panel) is one type of AM-LCD (Active Matrix LCD). With properties including low consumption, light and easy to use, high brightness, high contrast, high response speed, and no radiation, TFT-LCD has become a main stream technology of the flat displaying panel industry.

Referring to FIGS. 1a and 1b, at present, in the manufacturing process of the TFT-LCD, a signal line of an array substrate is often disconnected and requires to be repaired. When repairing the disconnected signal line, objects covering two ends of a disconnected portion are removed by laser and a repairing line connecting the two ends of the disconnected portion is formed by a coating device to conduct the signal line, as shown in FIG. 1a. However, at this time, there are other structures formed on the array substrate, which makes the surface of the array substrate be rough. The repairing line is formed on the rough surface. When a height difference of the surface located under the repairing line is relatively greater, the repairing line may be disconnected, as shown in FIG. 1b, which results in the failure of the repairing of the disconnected signal line, influences the yield rate of the liquid crystal panel, and may even result in the waste of the liquid crystal panel.

SUMMARY

The present disclosure provides a repairing method, a repairing device, and a repairing structure for a disconnected defect to improving the repairing success rate of the disconnected line.

The repairing method for the disconnected defect is used for repairing a signal line of an array substrate having the disconnected defect, including:

setting a repairing route according to a position of the disconnected defect and determining a position at which a filling portion is required to be formed according to the repairing route;

forming the filling portion at the position at which the filling portion is required to be formed; and forming a repairing line along the repairing route.

Preferably, the step of setting a repairing route according to a position of the disconnected defect and determining a position at which a filling portion is required to be formed according to the repairing route includes:

setting the repairing route according to the position of the disconnected defect and detecting the repairing route;

judging whether an inclined angle of a line connecting two adjacent positions on the repairing route is in a predetermined inclined angle range or not; and obtaining the two adjacent positions and determining that the space between the two adjacent positions is the position at which the filling portion is required to be formed if the inclined angle of the line connecting the two adjacent positions is in the predetermined inclined angle range.

Preferably, the step of detecting the repairing route includes:

scanning the repairing route using white-light interference or layer focus to obtain a coordinate of each position on the repairing route; and calculating the inclined angle of the line connecting two adjacent positions according to the coordinate of each position on the repairing route.

Preferably, the predetermined inclined angle range is from 30 degrees to 150 degrees.

Preferably, the predetermined inclined angle range is from 60 degrees to 120 degrees.

Preferably, the step of setting a repairing route according to a position of the disconnected defect and determining a position at which a filling portion is required to be formed according to the repairing route includes:

setting the repairing route according to the position of the disconnected defect; and determining that two sides of the signal line on the repairing route is the position at which the filling portion is required to be formed.

The repairing device for the disconnected defect is used for repairing a signal line of an array substrate having the disconnected defect, including:

a route setting module for setting a repairing route according to a position of the disconnected defect and determining a position at which a filling portion is required to be formed according to the repairing route;

a filling module for forming the filling portion at the position at which the filling portion is required to be formed; and a coating module for forming a repairing line along the repairing route.

Preferably, the route setting module includes:

a detecting unit for setting the repairing route according to the position of the disconnected defect and detecting the repairing route;

a judging unit for judging whether an inclined angle of a line connecting two adjacent positions on the repairing route is in a predetermine inclined angle range or not; and a position determining unit for obtaining the two adjacent positions and determining that the space between the two adjacent positions is the position at the filling portion is required to be formed if the inclined angle of the line connecting the two adjacent positions is in the predetermined inclined angle range.

Preferably, the detecting unit is further used for:

scanning the repairing route using white-light interference or laser focus to obtain a coordinate of each position on the repairing route; and calculating the inclined angle of the line connecting two adjacent positions according to the coordinate of each position at the repairing route.

Preferably, the predetermined inclined angle range is from 30 degrees to 150 degrees.

Preferably, the predetermined inclined angle range is from 60 degrees to 120 degrees.

The repairing structure for the disconnected line, including:

a repairing line formed according to a repairing route for repairing a signal line of an array substrate having the disconnected defect; and a filling portion located under the repairing line with a position thereof determined according to the repairing route.

Preferably, the filling portion is formed at a position corresponding to two adjacent positions on the repairing route connected by a line having an inclined angle in a predetermined inclined angle range.

Preferably, the predetermined inclined angle range is from 30 degrees to 150 degrees.

Preferably, the predetermined inclined angle range is from 60 degrees to 120 degrees.

Preferably, the filling portion is located at two sides of the signal line.

By detecting the repairing route before repairing the disconnected line by coating and forming the filling portion according to the repairing route, the present disclosure can avoid the disconnection of the repairing line caused by great height differences of the surface under the repairing line and improve the repairing success rate of the disconnected line.

DESCRIPTION OF THE DRAWINGS

Many aspects of the embodiments can be better understood with reference to the following drawings. The components in the drawings are not necessarily dawns to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment is this disclosure are not necessarily to the same embodiment, and such references mean at least one.

Figure 1A:
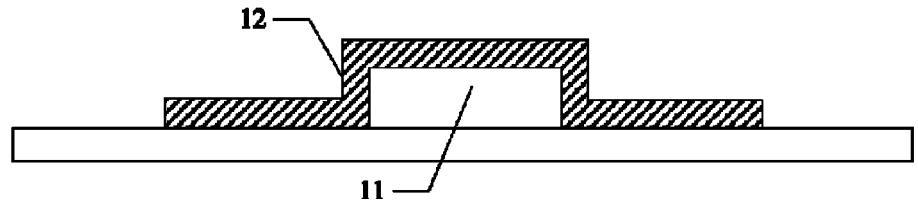
FIG. 1a is a schematic view of a repairing line of an array substrate in the conventional art.
Figure 1B:
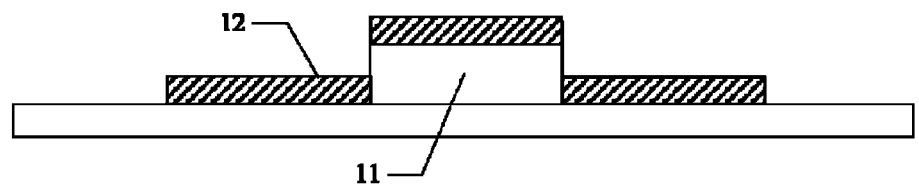
FIG. 1b is a schematic view showing the disconnection of the repairing line.
Figure 2:
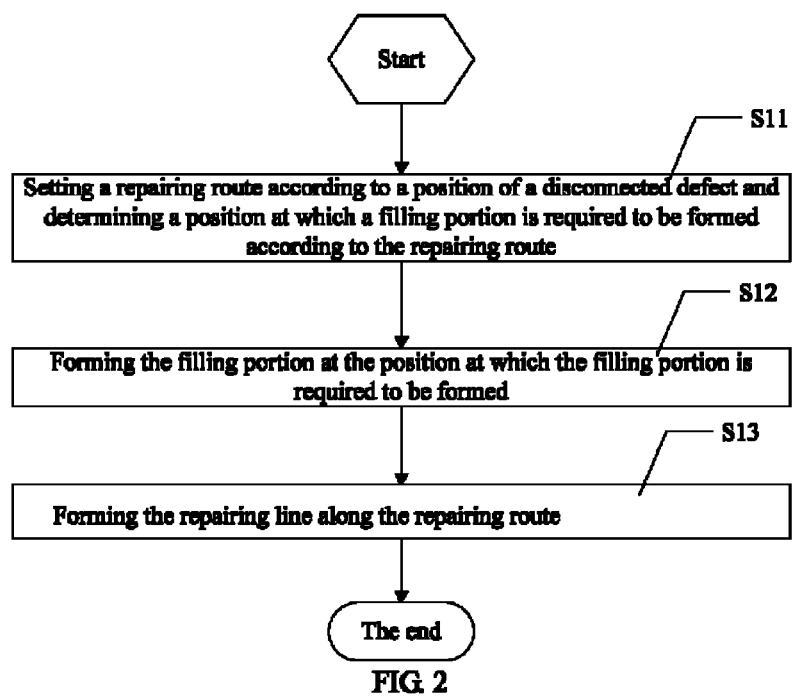
FIG. 2 is a flow chart of a repairing method for a disconnected defect in accordance with a first embodiment of the present disclosure.

Referring to FIG. 2, which is a flow chart of a repairing method for a disconnected defect in accordance with a first embodiment of the present disclosure. The repairing method for the disconnected defect is used for repairing a disconnected signal line of an array substrate. The repairing method for the disconnected defect includes the following steps.

Step S11, setting a repairing route according to a position of a disconnected defect and determining a position at which a filling portion is required to be formed according to the repairing route.

In the step, a repairing route through which the repairing line passes is preset according to the position of the disconnected defect and the position at which the filling portion is required to be formed is determined according to the repairing route. When the disconnected defect of the array substrate is repaired, if there is height difference between two adjacent positions in the repairing route, the repairing line may be disconnected, thus, the two adjacent positions having the height difference therebetween correspond to the position at which the filling portion is required to be formed. Since a thickness of the signal line of the array substrate is relatively great, the height of the signal line is greater than the height of other portions located at two sides of the signal line. That is, there is a height difference between the signal line and a position adjacent to the signal line, therefore, the two sides of the signal line correspond to the position at which the filling portion is required to be formed.

Step S12, forming the filling portion at the position at which the filling portion is required to be formed.

Figure 3:
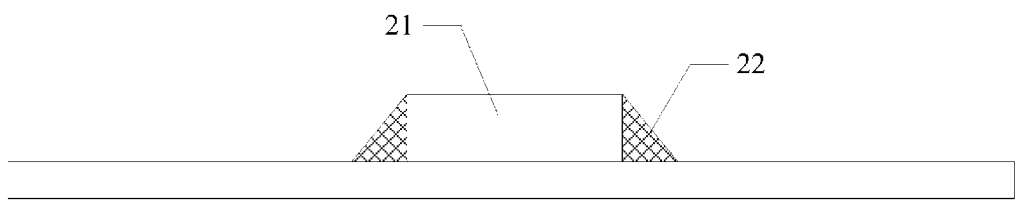
FIG. 3 is a schematic view of a filling portion formed in the repairing method for the disconnected defect.

In the embodiment, referring also to FIG. 3, which is a schematic view of a filling portion formed in the repairing method for the disconnected defect, according to the position at which the filling portion is required to be formed determined in the step S11, that is, two sides of the signal line 21, forming a filling portion 22 at each side of the signal line 21, which allows for a smooth transition from the signal line 21 located under the repairing route to each side thereof. In this way, when the disconnected defect is repaired in the following process, the failed repairing of the disconnected defect caused by the great height differences located under the repairing line can be avoided. The filling portion 22 is preferably made of insulating material. After the insulating material is formed at two sides of the signal line 21, a curing device is used for curing the insulating material to form the filling portion 22 by baking or ultraviolet irradiation. The filling portion 22 can be prevented from falling off in the following manufacturing process after being cured, which improves the stability of the filling portion 22 effectively and allows the following repairing of the disconnected defect to be carried out effectively.

Step S13, forming the repairing line along the repairing route.

Figure 4:
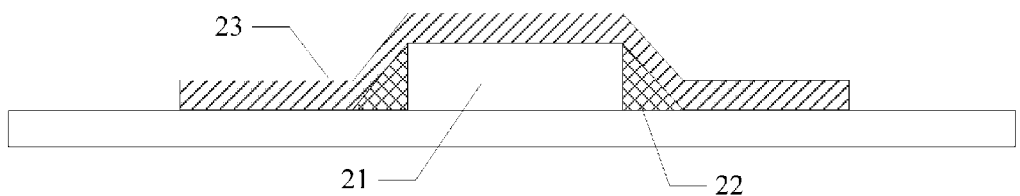
FIG. 4 is a schematic view of a repairing structure for a disconnected defect of the present disclosure.

In the step, referring also to FIG. 4, which is a schematic view of the repairing line of the present disclosure, the repairing line 23 is coated according to the repairing route with the filling portion formed thereunder. There is no rough surface having a great height difference under the repairing line, thus, the disconnection of the repairing line can be avoided effectively to improve the yield rate of the repairing of the disconnected line.

Figure 5:
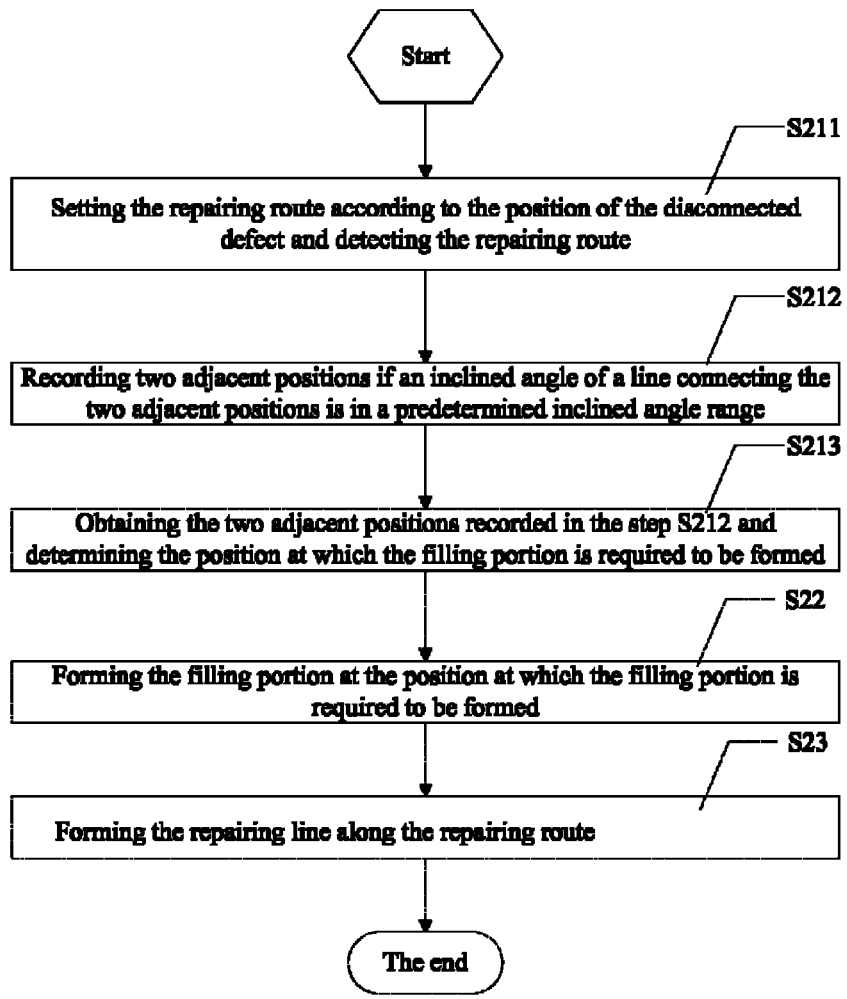
FIG. 5 is a flow chart of a repairing method for a disconnected defect in accordance with a second embodiment of the present disclosure.

Referring to FIG. 5, which is a flow chart of a repairing method for a disconnected defect in accordance with a second embodiment of the present disclosure. The repairing method for the disconnected defect of the embodiment includes:

Step S21, setting a repairing route according to a position of the disconnected defect and determining a position at which a filling portion is required to be formed according to the repairing route.

In the manufacturing process of a TFT array substrate, signal lines are often disconnected and need to be repaired. In order to avoid the failed repairing caused by a height difference between two adjacent positions in the repairing route, the position at which the filling portion is required to be formed needs to be determined according to the repairing route.

Figure 6:
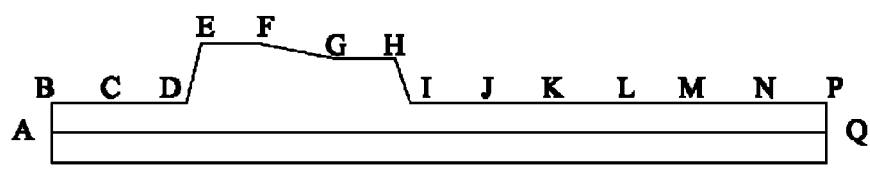
FIG. 6 is a partial cross section of a repairing route.

Referring also to FIG. 6, the step S21 specifically includes the following steps.

Step S211, setting the repairing route according to the position of the disconnected defect and detecting the repairing route.

The repairing route is set according to the position of the disconnected defect, as shown in FIG. 6, which is a partial cross section of the repairing route.

The repairing route can be scanned using white-light interference or using laser focus to obtain a coordinate of each position on the repairing route. As shown in FIG. 6, a number of positions on the repairing route which are evenly spaced apart from each other horizontally, including A, B, C, D, E . . . P, and Q are chosen, and then the coordinates of the chosen positions, including $A(x_A, y_A)$, $B(x_B, y_B)$, $C(x_c, y_c)$, $D(x_D, y_D)$, $E(x_E, y_E)$, . . . , $P(x_P, y_P)$, and $Q(x_Q, y_Q)$ are detected.

Step S212, recording two adjacent positions if an inclined angle of a line connecting the two adjacent positions is in a predetermined inclined angle range.

In the step, after the coordinate of each position on the repairing route detected in the step S211 is obtained and the inclined angle of the line connecting two adjacent positions on the repairing route is calculated, if the inclined angle of the line connecting the two adjacent positions is not in a predetermined inclined angle range, the positions do not cause the disconnection of the repairing line, if the inclined angle of the line connecting the two adjacent positions is in the predetermined inclined angle range, the positions may cause the disconnection of the repairing line, at this time, the two adjacent positions are recorded. As shown in FIG. 6, the coordinates $A(x_A, y_A)$, $C(x_B, y_B)$, $C(x_C, y_C)$, $D(x_D, y_D)$, $E(x_E, y_E)$, . . . , $P(x_P, y_P)$, and $Q(x_Q, y_Q)$ of the positions A, B, C, D, E . . . P, and Q are obtained, and then the inclined angle α of the line connecting two adjacent positions is calculated. For example, the inclined angle of the line connecting the position A and the position B is arc tan $(y_B-y_A)/(x_B-x_A)$ and the inclined angle of the line connecting the position C and the position D is arc tan $(y_D-y_C)/(x_D-x_C)$, etc. In the embodiment, the predetermined inclined angle range is from 30 degrees to 50 degrees, that is, if the inclined angle of the line connecting two adjacent positions is in the range from 30 degrees to 50 degrees, the inclined angle of the line connecting the two adjacent positions is in the predetermined inclined angle range. Or, the predetermined inclined angle range may be from 60 degrees to 120 degrees. As shown in FIG. 6, the inclined angle of the line connecting the position D and the position E is 75 degrees, therefore, the position D and the position E are recorded; the inclined angle of the line connecting the position H and the position I is 110 degrees, therefore, the position H and the position I are recorded.

In the step S213, obtaining the two adjacent positions recorded in the step S212 and determining the position at which the filling portion is required to be formed.

Since the inclined angle of the line connecting the two adjacent positions recorded in the step S212 is in the predetermined inclined angle range, thus, the height difference between the two adjacent positions may cause the disconnection of the repairing line, therefore, the space between the two adjacent positions recorded in the step S212 is the position at which the filling portion is required to be formed. As shown in FIG. 6, the space between the position D and the position E and the space between the portion position H and the position I are the positions at which the filling portion is required to be formed.

Step S22, forming the filling portion at the position at which the filling portion is required to be formed.

Figure 7:
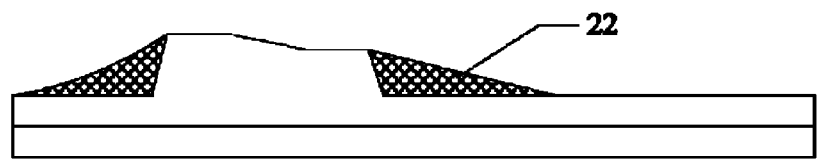
FIG. 7 is a schematic view the filling portion formed on the repairing route.

Referring also to FIG. 7, which is a schematic view the filling portion formed on the repairing route. In the step, according to the position at which the filling portion is required to be formed obtained in the step S21, that is, the filling portion is formed between the position D and the position E and between the position H and the position I, which allows for a smooth transition from the position D and the position E under the repairing route and allows for a smooth transition from the position H to the position I under the repairing route, and further effectively avoids the failed repairing of the disconnected defect caused by the great height difference between two adjacent positions under the repairing line. The filling portion is preferably made of insulating material. After the insulating material is formed between the position D and the position E and between the position H and the position I, a curing device is used for curing the insulating material to form the filling portion 22 by baking or ultraviolet irradiation. After the filling portion 22 is cured, the filling portion 22 can be prevented from falling off in the following manufacturing process to improve the stability of the filling portion and to carry out the repairing of the disconnected lines effectively in the following manufacturing process.

Step S23, forming the repairing line along the repairing route.

Figure 8:
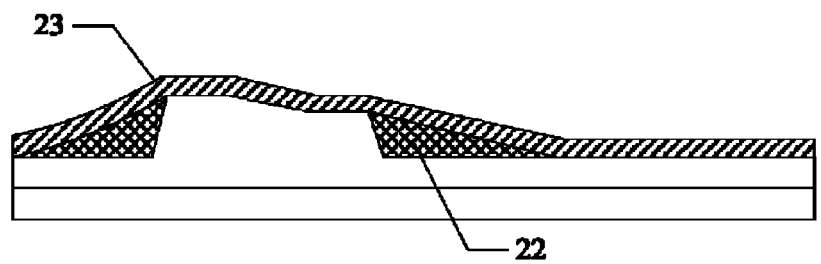
FIG. 8 is a schematic view of a repairing line.

Referring also to FIG. 8, which is a schematic view of the repairing line. The repairing line 23 is coated along the repairing route after the filling portion 22 is formed. There is no rough surface having a great height difference under the repairing line 23, thus, the disconnection of the repairing line can be avoided effectively to improve the yield rate of the repairing of the disconnected defect.

The present disclosure further provides repairing structure for a disconnected defect. As shown in FIGS. 4 and 7, the repairing structure for the disconnected defect includes a repairing line 23 formed according to a set repairing route and a filling portion 22 located under the repairing line 23. The repairing line 23 is used for repairing a signal line (not shown in the drawing) of an array substrate which has the disconnected defect. The filling portion 22 is located at a position on the repairing route which has a great height difference for reducing the height difference between two adjacent positions under the repairing line. For example, the filling portion 22 is located at two sides of the signal line or located between two adjacent positions which are connected by a line having an inclined angle in the predetermined inclined angle range. Since the filling portion 22 of the repairing structure is formed between the two adjacent positions having a great height difference therebetween, therefore, repairing the disconnected defect of the array substrate by the repairing structure, the repairing line can be continuous and prevented from being disconnected, which avoids the failed repairing of the disconnected defect caused by the height difference and improves the repairing success rate of the disconnected line.

Figure 9:
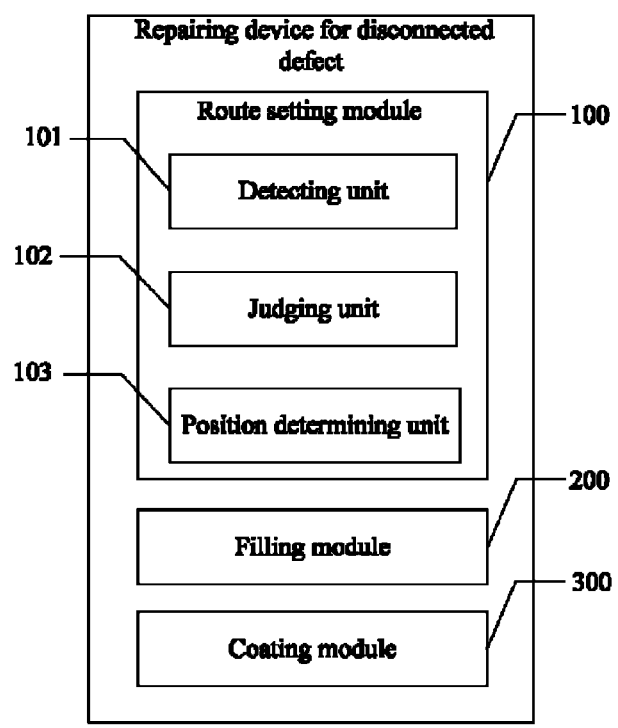
FIG. 9 is a schematic view of a repairing device for a disconnected defect of the present disclosure.

Referring to FIG. 9, which is a schematic view of a line repairing device for a disconnected defect of the present disclosure. The repairing device for the disconnected defect of the embodiment is used for repairing a signal line of an array substrate having the disconnected defect. The repairing device includes a route setting module 100, a filing module 200, and a coating module 300.

The route setting module 100 is used for setting a repairing route according to a position of the disconnected defect and determining a position at which a filling portion is required to be formed according to the repairing route.

The filling module 200 is used for forming the filling portion at the determined position at which the filling portion is required to be formed The coating module 300 is used for forming the repairing line along the repairing route.

The route setting module 100 includes:

a detecting unit 101 for setting the repairing route according to the position of the disconnected defect and detecting the repairing route;

a judging unit 102 for judging whether an inclined angle of a line connecting two adjacent positions on the repairing route is in a predetermined inclined angle range or not; and a position determining unit 103 for obtaining the two adjacent positions and determining that the space between the two adjacent positions is the position at which the filling portion is required to be formed if the inclined angle of the line connecting the two adjacent positions is in the predetermined inclined angle range.

The detecting unit 101 is further used for:

scanning the repairing route using white-light interference or laser focus to obtain a coordinate of each position on the repairing route; and according to the coordinate of each position on the repairing route, calculating the inclined angle of the line connecting two adjacent positions.

The principle of the repairing device for the disconnected defect of the embodiment and the obtained repairing structure can be referred to the above embodiments shown in the FIGS. 2 to 8, which is not given detail again. With the repairing device of the present disclosure, the disconnection of the repairing line caused by great height differences of the surface located under the repairing line can be avoided, which improves the repairing success rate of the disconnected line.

Even though information and the advantages of the present embodiments have been set forth in the foregoing description, together with details of the mechanisms and functions of the present embodiments, the disclosure is illustrative only; and that changes may be made in detail, especially in matters of shape, size, and arrangement of parts within the principles of the present embodiments to the full extend indicated by the broad general meaning of the terms in which the appended claims are expressed.

What is claimed is:

1. A repairing method for a disconnected defect using for repairing a signal line of an array substrate having the disconnected defect, comprising:

setting a repairing route according to a position of the disconnected defect and determining a position at which a filling portion is required to be formed according to the repairing route;

forming the filling portion at the position at which the filling portion is required to be formed; and forming a repairing line along the repairing route.

2. The repairing method as claimed in claim 1, wherein setting a repairing route according to a position of the disconnected defect and determining a position at which a filling portion is required to be formed according to the repairing route comprises:

setting the repairing route according to the position of the disconnected defect and detecting the repairing route;

judging whether an inclined angle of a line connecting two adjacent positions on the repairing route is in a predetermined inclined angle range or not; and obtaining the two adjacent positions and determining that the space between the two adjacent positions is the position at which the filling portion is required to be formed if the inclined angle of the line connecting the two adjacent positions is in the predetermined inclined angle range.

3. The repairing method as claimed in claim 2, wherein detecting the repairing route comprises:

scanning the repairing route using white-light interference or laser focus to obtain a coordinate of each position at the repairing route; and calculating the inclined angle of the line connecting two adjacent positions according to the coordinate of each position on the repairing route.

4. The repairing method as claimed in claim 2, wherein the predetermined inclined angle range is from 30 degrees to 150 degrees.

5. The repairing method as claimed in claim 4, wherein the predetermined inclined angle range is from 60 degrees to 120 degrees.

6. The repairing method as claimed in claim 1, wherein setting a repairing route according to a position of the disconnected defect and determining a position at which a filling portion is required to be formed according to the repairing route comprises:

setting the repairing route according to the position of the disconnected defect; and determining that two sides of the signal line at the repairing route is the position at which the filling portion is required to be formed.

7. A repairing device for repairing a signal line of an array substrate having a disconnected defect, comprising:

a route setting module for setting a repairing route according to a position of the disconnected defect and determining a position at which a filling portion is required to be formed according to the repairing route;

a filling module for forming the filling portion at the position at which the filling portion is required to be formed; and a coating module for forming a repairing line along the repairing route.

8. The repairing device as claimed in claim 7, wherein the route setting module comprises:

a detecting unit for setting the repairing route according to the position of the disconnected defect and detecting the repairing route;

a judging unit for judging whether an inclined angle of a line connecting two adjacent positions at the repairing route is in a predetermine inclined angle range or not; and a position determining unit for obtaining the two adjacent positions and determining that the space between the two adjacent positions is the position at which the filling portion is required to be formed if the inclined angle of the line connecting the two adjacent positions is in the predetermined inclined angle range.

9. The repairing device as claimed in claim 8, wherein the detecting unit is further used for:

scanning the repairing route using white-light interference or laser focus to obtain a coordinate of each position on the repairing route; and calculating the inclined angle of the line connecting two adjacent positions according to the coordinate of each position at the repairing route.

10. The repairing device as claimed in claim 8, wherein the predetermined inclined angle range is from 30 degrees to 150 degrees.

11. The repairing device as claimed in claim 10, wherein the predetermined inclined angle range is from 60 degrees to 120 degrees.

12. A repairing structure for a disconnected defect, comprising:

a repairing line formed according to a repairing route for repairing a signal line of an array substrate having the disconnected defect; and a filling portion located under the repairing line with a position thereof determined according to the repairing route.

13. The repairing structure as claimed in claim 12, wherein the filling portion is formed at a position corresponding to two adjacent positions on the repairing route connected by a line having an inclined angle in a predetermined inclined angle range.

14. The repairing structure as claimed in claim 13, wherein the predetermined inclined angle range is from 30 degrees to 150 degrees.

15. The repairing structure as claimed in claim 14, wherein the predetermined inclined angle range is from 60 degrees to 120 degrees.

16. The repairing structure as claimed in claim 12, wherein the filling portion is located at two sides of the signal line.

* * * * *